United States Patent
Xu et al.

(10) Patent No.: US 11,181,356 B2
(45) Date of Patent: Nov. 23, 2021

(54) THREE-COORDINATE MEASURING SYSTEM AND METHOD

(71) Applicant: CITIC Dicastal CO., LTD., Hebei (CN)

(72) Inventors: Zuo Xu, Qinhuangdao (CN); Liang Huang, Qinhuangdao (CN); Yuqiang Wang, Qinhuangdao (CN); Honglei Liu, Qinhuangdao (CN); Bao Zhang, Qinhuangdao (CN); Jinqi Lyu, Qinhuangdao (CN); Qingbo Kong, Qinhuangdao (CN)

(73) Assignee: CITIC Dicastal CO., LTD., Qinhuangdao (CN)

( * ) Notice: Subject to any disclaimer, the term of this patent is extended or adjusted under 35 U.S.C. 154(b) by 127 days.

(21) Appl. No.: 16/455,402

(22) Filed: Jun. 27, 2019

(65) Prior Publication Data

US 2020/0149858 A1   May 14, 2020

(30) Foreign Application Priority Data

Nov. 8, 2018  (CN) .......................... 201811326874.0

(51) Int. Cl.
*G01B 5/008*    (2006.01)
*G01B 5/00*     (2006.01)
*G01B 21/04*    (2006.01)

(52) U.S. Cl.
CPC ........... *G01B 5/008* (2013.01); *G01B 5/0025* (2013.01); *G01B 21/047* (2013.01)

(58) Field of Classification Search
CPC .............................. G01B 5/008; G01B 5/0025
(Continued)

(56) References Cited

U.S. PATENT DOCUMENTS 5,646,732 A * 7/1997 Gerlach ............... G01B 11/005
                                                    33/503
2010/0198381 A1* 8/2010 Feldman ................. B24B 9/144
                                                    700/97
(Continued)

FOREIGN PATENT DOCUMENTS

CN      104864826 A     8/2015
CN      105737775 A     7/2016
(Continued)

OTHER PUBLICATIONS

Supplementary European Search Report in the European application No. 19194803.3, dated Apr. 17, 2020.

*Primary Examiner* — George B Bennett
(74) *Attorney, Agent, or Firm* — Syncoda LLC; Feng Ma (57) ABSTRACT

A three-coordinate measuring system includes a three-coordinate measuring apparatus, and a type collector for a product to be measured; the apparatus is provided with a probe, and a control component which controls motion of the probe through a measuring program preset according to product type of the product to be measured, the control component is electrically connected to the probe; the type collector includes an optical collecting head capable of scanning a graphic identifier, the optical collecting head is electrically connected to the control component; the control component acquires the product type of the product to be measured according to the graphic identifier scanned by the optical collecting head, and call a corresponding measuring program to control the motion of the probe in order to measure the product to be measured and acquire measuring data, a method for three-coordinate measuring is also provided.

6 Claims, 6 Drawing Sheets

(58) Field of Classification Search
USPC .......................................................... 33/503
See application file for complete search history.

(56) References Cited

U.S. PATENT DOCUMENTS

| | | | |
|---|---|---|---|
| 2013/0197852 A1* | 8/2013 | Grau | G01B 11/03 |
| | | | 702/123 |
| 2014/0157610 A1* | 6/2014 | Garvey | G05B 19/401 |
| | | | 33/503 |
| 2015/0345932 A1* | 12/2015 | Wakai | G01B 21/047 |
| | | | 33/503 |
| 2016/0084633 A1* | 3/2016 | Ferrari | G01B 11/005 |
| | | | 33/503 |
| 2017/0234669 A1 | 8/2017 | Grau et al. | |
| 2019/0101889 A1 | 4/2019 | Riek et al. | |

FOREIGN PATENT DOCUMENTS

| | | |
|---|---|---|
| CN | 105892089 A | 8/2016 |
| CN | 106155016 A | 11/2016 |
| CN | 106845579 A | 6/2017 |
| CN | 108177946 A | 6/2018 |
| CN | 207894623 U | 9/2018 |
| CN | 208902081 U | 5/2019 |
| DE | 102016209557 A1 | 12/2017 |
| WO | 2013112455 A1 | 8/2013 |

\* cited by examiner

Wheel type comparison table

| Serial number | wheel type number | mold number | picture | barcode |
|---|---|---|---|---|
| 1 | 00111C01 | 01 |  |  00111C0101 |
| 2 | 00111C02 | 11 |  |  00111C0211 |
| 3 | 00111C03 | 05 |  |  00111C0305 |
| 4 | 00111C05 | 08 |  |  00111C0508 |
| 5 | 00111C06 | 01 |  |  00111C0601 |
| 6 | 00111C07 | 12 |  |  00111C0712 |
| 7 | 00511C08 | 01 |  |  00511C0801 |
| 8 | 01011C09 | 01 |  |  01011C0901 |

FIG. 6

THREE-COORDINATE MEASURING SYSTEM AND METHOD

CROSS-REFERENCE TO RELATED APPLICATION

The present application claims benefit of Chinese Patent Application No. 201811326874.0, filed on Nov. 8, 2018, the disclosure of which is hereby incorporated by reference in its entirety.

BACKGROUND

A three-coordinate measuring machine is a dimensional measuring device widely used in the industries of machinery, electronics, instrumentation, plastics, etc. The measuring process is to obtain the three-dimensional coordinate position of the measuring points on a measured object by placing the measured object in a measuring space of the three-coordinate measuring machine, and then calculate geometric size, shape and position of the measured object according to the spatial coordinate values of these points. The three-coordinate measuring machine is one of the most effective methods for measuring and obtaining dimensional data, because it can replace a variety of surface measuring tools and expensive combined gauges, and reduce the time required for complex measuring tasks from hours to minutes, which cannot be achieved by other instruments.

At present, in the production of vehicle aluminum alloy hubs (hereinafter referred to as hubs), many important dimensions are measured by the three-coordinate measuring machine. Due to the large output and large measuring workload of the hub, it is generally to preset a plurality of measuring programs in the three-coordinate measuring machine. Each measuring program corresponds to a unique type and a unique mold-made hub, and the corresponding program is directly called during measuring, so that the alignment of the workpiece is not needed and the measuring speed is improved; however, in the related art, when the three-coordinate measuring machine calls the program, the operator needs to find and call the program from the three-coordinate measuring machine according to the type of the hub and the mold. Because there are many types and molds of hubs, the search is slow and the measuring efficiency is lowered, and the types or the molds of the hubs are often misidentified due to the small difference in the appearance between different types or molds hubs and the inexperience of new employees, so that the measuring program call is wrong, resulting in the collision damage of moving parts such as the probe of the three-coordinate measuring machine, which has a great influence on the measuring and production, resulting in a large economic loss.

SUMMARY

The present disclosure relates to product size measuring techniques and in particular to a three-coordinate measuring system and method.

According to a first aspect of the present disclosure, there is provided a system for three-coordinate measuring, the system may include a three-coordinate measuring apparatus, and a type collector for a product to be measured; the three-coordinate measuring apparatus is provided with a probe, and a control component is arranged to control motion of the probe through a measuring program preset according to product type, herein the control component is arranged to be electrically connected to the probe; the type collector for the product to be measured includes an optical collecting head capable of scanning a graphic identifier, herein the optical collecting head is arranged to be electrically connected to the control component; the control component is arranged to acquire the product type of the product to be measured according to the graphic identifier scanned by the optical collecting head, and call a corresponding measuring program to control the motion of the probe in order to measure the product to be measured and acquire measuring data.

The graphic identifier is a barcode or a two-dimensional code, and the type collector for the product to be measured is a barcode scanner or a two-dimensional code scanner.

The three-coordinate measuring apparatus may further include a memory, the memory is arranged to store the measuring program, and the memory is arranged to be electrically connected to the control component.

The three-coordinate measuring apparatus is further provided with a display device, the display device is arranged to be electrically connected to the control component; the control component is further arranged to send the product type to the display device after acquiring the product type of the product, and the display device is arranged to display the product type.

The three-coordinate measuring system is further provided with an identifier printing apparatus which is arranged to print the graphic identifier according to the acquired inspection instruction of the product to be measured, the graphic identifier may contain product type information of the product to be measured and can be pasted on a surface of the product to be measured; and the identifier printing apparatus is arranged to be electrically connected to the control component.

The three-coordinate measuring system may further include an inspection instruction generating device which is arranged to generate an inspection instruction according to warehousing of the product to be measured, and an inspection work order printing apparatus which is arranged to print an inspection work order according to the inspection instruction; after the inspection instruction generating device generates the inspection instruction, the identifier printing apparatus is arranged to print the graphic identifier and at the same time the inspection work order printing apparatus is arranged to print the inspection work order; the inspection instruction generating device and the inspection work order printing apparatus are both arranged to be electrically connected to the control component.

According to a second aspect of the present disclosure, there is provided a three-coordinate measuring method, the method includes: acquiring product type of a product to be measured according to the graphic identifier scanned by an optical collecting head; calling a preset measuring program according to the acquired product type; controlling the motion of a probe according to the measuring program; measuring the product to be measured and acquiring measuring data.

The acquiring the product type of the product to be measured according to the graphic identifier scanned by the optical collecting head may include: scanning, by the optical collecting head, the graphic identifier placed within scanning range of the optical collecting head; acquiring the product type of the product to be measured according to pattern of the graphic identifier acquired by scanning of the optical collecting head.

Before the acquiring the product type of the product to be measured according to the graphic identifier scanned by the optical collecting head, the method may further include:

controlling, according to an inspection instruction generated by an inspection instruction generating device, the identifier printing apparatus to print the graphic identifier of the product corresponding to the inspection instruction and the inspection work order printing apparatus to print the inspection work order of the product corresponding to the inspection instruction at the same time according to the inspection instruction generated by the inspection instruction generating device.

Before the controlling, according to the inspection instruction generated by the inspection instruction generating device, the identifier printing apparatus to print the graphic identifier of the product corresponding to the inspection instruction and the inspection work order printing apparatus to print the inspection work order of the product corresponding to the inspection instruction at the same time, the method may further include: controlling the inspection instruction generating device to generate the inspection instruction according to warehousing of the product to be measured.

BRIEF DESCRIPTION OF THE DRAWINGS

The present disclosure will become more fully understood from the detailed description given herein below and the accompanying drawings, which are given by illustration only, and thus are not limitative of the present disclosure, and wherein.

DETAILED DESCRIPTION

The present disclosure provides a three-coordinate measuring system, herein the three-coordinate measuring system includes a three-coordinate measuring apparatus, and a type collector for a product to be measured; the three-coordinate measuring apparatus is provided with a probe, and a control component which controls motion of the probe through a measuring program preset according to product type, herein the control component is electrically connected to the probe; the type collector for the product to be measured includes an optical collecting head capable of scanning a graphic identifier, herein the optical collecting head is electrically connected to the control component; the control component acquires the product type of the product to be measured according to the graphic identifier scanned by the optical collecting head, and calls a corresponding measuring program to control the motion of the probe in order to measure the product to be measured and acquire measuring data.

The three-coordinate measuring system and method provided by the present disclosure can replace the manual identification search by reading and recognizing the graphic identifier, and can conveniently, accurately and quickly call the measuring program in the three-coordinate measuring apparatus to improve detecting efficiency and reduce abnormal damage to equipment.

The present disclosure will be further described in detail below in conjunction with the drawings and specific embodiments. It is understood that the specific embodiments described herein are merely illustrative of the disclosure and are not intended to limit the disclosure.

First Embodiment

Figure 1:
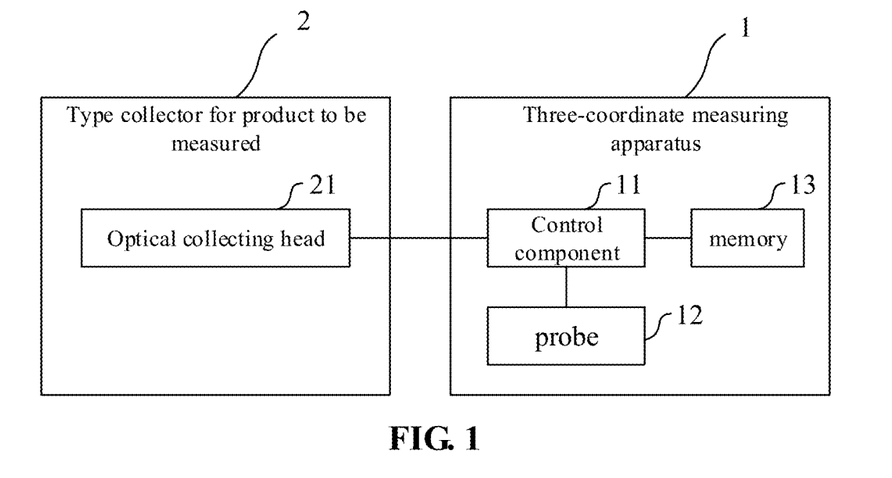
FIG. 1 is a schematic diagram of the three-coordinate measuring system according to Embodiment 1 of the present disclosure.

As shown in FIG. 1, an embodiment of the present disclosure provides a three-coordinate measuring system, herein the three-coordinate measuring system includes a three-coordinate measuring apparatus 1, and a type collector 2 for a product to be measured; the three-coordinate measuring apparatus 1 is provided with a probe 12 and a control component 11, herein the control component 11 is electrically connected to the probe 12; the type collector 2 for the product to be measured includes an optical collecting head 21 capable of scanning a graphic identifier, herein the optical collecting head 21 is electrically connected to the control component 11; the control component 11 acquires the product type of the product to be measured according to the graphic identifier scanned by the optical collecting head 21, and calls a corresponding measuring program according to the acquired product type, so that the control component controls the motion of the probe 12 by the called measuring program in order to measure the product to be measured and acquire measuring data.

Specifically, the graphic identifier includes product type information, and pattern of the graphic identifier corresponds to the product type one by one, that is, one graphic identifier corresponds to one product type and also corresponds to one measuring program. Preferably, the graphic identifier may be a barcode or a two-dimensional code, and it is a barcode in the present embodiment (see FIG. 5 for the graphic). But it should be understood that other graphic identifiers capable of carrying product type information may also be used. Correspondingly, the type collector 2 for the product to be measured may be a barcode scanner or a two-dimensional code scanner, but the disclosure is not limited thereto, and the type collector 2 for the product to be measured shall be selected according to the selection of the type of the graphic identifier. The type collector 2 for the product to be measured can be integrated with the three-coordinate measuring apparatus 1, that is, the type collector 2 for the product to be measured is fixed together with the three-coordinate measuring apparatus 1. The optical collecting head 21 is exposed in the form of a window. When used, the operator can place the graphic identifier in the scanning range of the optical collecting head 21. But it should be understood that the type collector 2 for the product to be measured may also be connected to the three-coordinate measuring apparatus 1 in other manners and scan the graphic identifier, for example, the type collector 2 for the product to be measured is movably disposed outside the three-coordinate measuring apparatus 1 and connected to the three-coordinate measuring apparatus 1 by wire or wirelessly. In use, the operator can place the graphic identifier within the scanning range of the optical collecting head 21, or move the type collector 2 for the product to be measured to scan the graphic identifier. The optical collecting head 21 scans the graphic identifier of the product to be measured, and transmits the acquired graphic identifier pattern to the control component 11.

In the embodiment of the present disclosure, the three-coordinate measuring apparatus 1 further includes a memory 13, herein the memory 13 stores the measuring program, and the memory 13 is electrically connected to the control component 11.

Specifically, the measuring program corresponding to the product type is pre-stored in the memory 13, and the control component 11 acquires the product type of the product to be measured according to the graphic identifier scanned by the optical collecting head 21, and calls the corresponding measuring program from the memory 13 according to the acquired product type. Then, the control component 11 controls the probe 12 to measure the product to be measured by the called measuring program, and calculates and acquires the measuring data of the product to be measured according to the coordinate values of the probe 12.

The three-coordinate measuring system provided by the embodiment of the present disclosure scans the graphic identifier of the product to be measured by the type collector 2 for the product to be measured, and the control component 11 identifies the product type of the product to be measured, and calls the corresponding measuring program according to the identified product type, so that it does not needed to manually identify the product type and search for the measuring program, which greatly improves the measuring efficiency. In addition, the graphic identifier can directly, quickly and accurately identify the product type of the product to be measured and call the corresponding measuring program, so that the mistakes of human identification and the mistakes occur when calling the program are avoided, thereby reducing the abnormal damage of the device.

Figure 2:
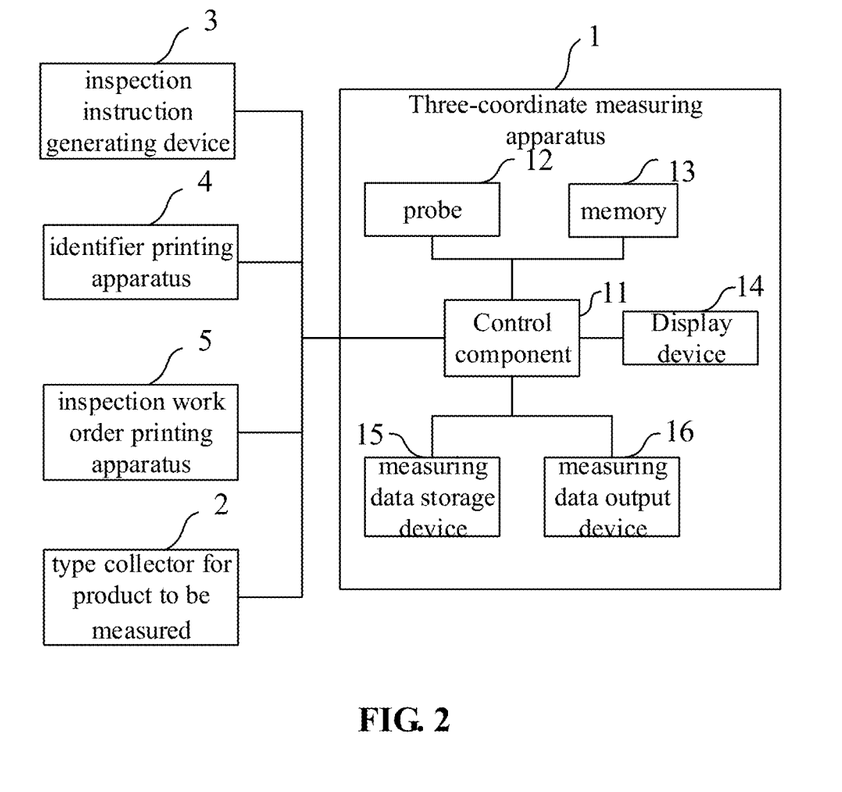
FIG. 2 is a schematic diagram of the three-coordinate measuring system according to the Embodiment 1 of the present disclosure.

Preferably, as shown in FIG. 2, the three-coordinate measuring system further includes an inspection instruction generating device 3 which generates the inspection instruction according to warehousing of the product to be measured, herein the inspection instruction generating device 3 and the control component 11 are electrically connected. The three-coordinate measuring system can be connected to the material system of the factory, that is, the control component of the three-coordinate measuring apparatus is connected to the material system of the factory; the warehousing of the product is generally issued by the material system, so that the control component can generate an inspection instruction according to the warehousing instruction issued by the material system. In addition, the material system generally may also generate an inspection instruction, so the three-coordinate measuring system can independently be provided an inspection instruction generating device, or use the inspection instruction of the material system. The material system here may be an enterprise resource planning (ERP) system or a material requirement planning (MRP) system.

Preferably, the three-coordinate measuring system may further includes an identifier printing apparatus 4 which prints the graphic identifier according to the acquired inspection instruction of the product to be measured, and an inspection work order printing apparatus 5 which prints the inspection work order according to the inspection instruction, herein the identifier printing apparatus 4 and the inspection work order printing apparatus 5 are electrically connected to the control component 11, respectively. The graphic identifier printed by the identifier printing apparatus 4 contains the product type information of the product to be measured and can be pasted on the surface of the product to be measured. Preferably, the graphic identifier is printed on self-adhesive paper, and the self-adhesive paper has the advantages of convenient use, easy printing, pasting, etc., but the disclosure is not limited thereto, for example, printing a graphic identifier on paper, and it is also possible to stick the graphic identifier to the surface of the product to be measured by means of a solid glue or a liquid glue. In addition, the inspection work order preferably includes product type information of the product to be measured and the graphic identifier, so that the measurer further verify whether the product type of the product to be measured is correct.

After the inspection instruction generating device 3 generates the inspection instruction, the identifier printing apparatus 4 and the inspection work order printing apparatus 5 respectively print the graphic identifier and the inspection work order at the same time.

The three-coordinate measuring system provided by the embodiment of the present disclosure further configures the inspection instruction generating device 3, the identifier printing apparatus 4 and the inspection work order printing apparatus 5, so that the product type represented by the graphic identifier is printed by the system directly according to the warehousing of the product to be measured, and it does not need to print after manually identify the product type, further avoiding the mistake of product type caused by man-made faults, thus ensuring the accuracy of measuring data and avoiding the abnormal damage of the equipment.

In addition, the graphic identifier is pasted on the product, which facilitates the classification, storage and searching of the product.

Preferably, the three-coordinate measuring apparatus 1 can further be provided with a display device 14, herein the display device 14 is electrically connected to the control component 11; the control component 11 sends the product type to the display device 14 after acquiring the product type of the product, and the display device 14 displays the product type for operator verification. In this way, it can be further ensured that the called measuring procedure corresponds to the product to be measured, thereby avoiding economic loss. In addition, the three-coordinate measuring apparatus 1 displays the measured measuring data on the display device 14 for the operator to view. In addition, in practical use, after the display device 14 displays the product type, the control component 11 may control the probe 12 to perform measuring by the called measuring program after the operator confirms the confirmation.

Preferably, the three-coordinate measuring apparatus 1 is further provided with a measuring data storage device 15 and a measuring data output device 16, which are electrically connected to the control component 11, respectively. After the measuring by the three-coordinate measuring apparatus 1 is completed, the measuring data may be stored by the measuring data storage device 15, or the measuring report may be automatically printed by the measuring data output device 16, or the electronic version of the measuring report may be output. In this way, it is convenient to statistically analyze, analyze and utilize measuring data to improve product quality.

Second Embodiment

Figure 3:
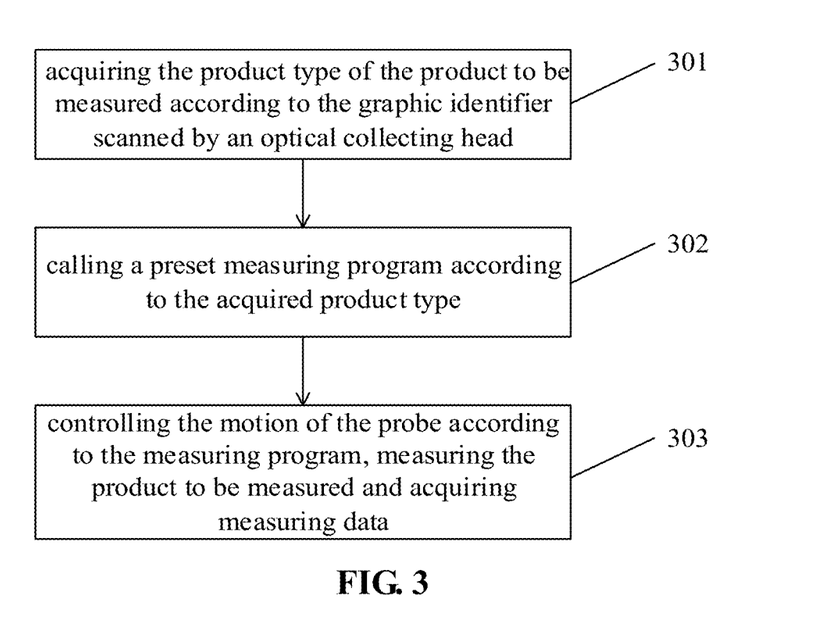
FIG. 3 is a schematic diagram of the three-coordinate measuring method according to Embodiment 2 of the present disclosure.

As shown in FIG. 3, an embodiment of the present disclosure further provides a three-coordinate measuring method, which may be performed by the control component of the three-coordinate measuring system, and the method includes:

Step 301: acquiring the product type of the product to be measured according to the graphic identifier scanned by an optical collecting head;

Specifically, the step of acquiring the product type of the product to be measured according to the graphic identifier scanned by the optical collecting head includes:

scanning, by the optical collecting head, the graphic identifier placed within the scanning range of the optical collecting head;

acquiring the product type of the product to be measured according to the pattern of the graphic identifier acquired by scanning of the optical collecting head.

Step 302: calling a preset measuring program according to the acquired product type;

Step 303: controlling the motion of the probe according to the measuring program, measuring the product to be measured and acquiring measuring data.

Preferably, before the step of acquiring the product type of the product to be measured according to the graphic identifier scanned by the optical collecting head, the method further includes:

Controlling, according to the inspection instruction generated by the inspection instruction generating device, the identifier printing apparatus to print the graphic identifier of the product corresponding to the inspection instruction and the inspection work order printing apparatus to print the inspection work order of the product corresponding to the inspection instruction at the same time.

Preferably, before the step of controlling, according to the inspection instruction generated by the inspection instruction generating device, the identifier printing apparatus to print the graphic identifier of the product corresponding to the inspection instruction and the inspection work order printing apparatus to print the inspection work order of the product corresponding to the inspection instruction at the same time, the method further includes:

controlling the inspection instruction generating device to generate the inspection instruction according to the warehousing of the product to be measured.

Preferably, after the step of controlling the motion of the probe according to the measuring program, measuring the product to be measured and acquiring measuring data, the method further includes:

storing or outputting a measuring report according to the measuring data.

Third Embodiment

Figure 4:
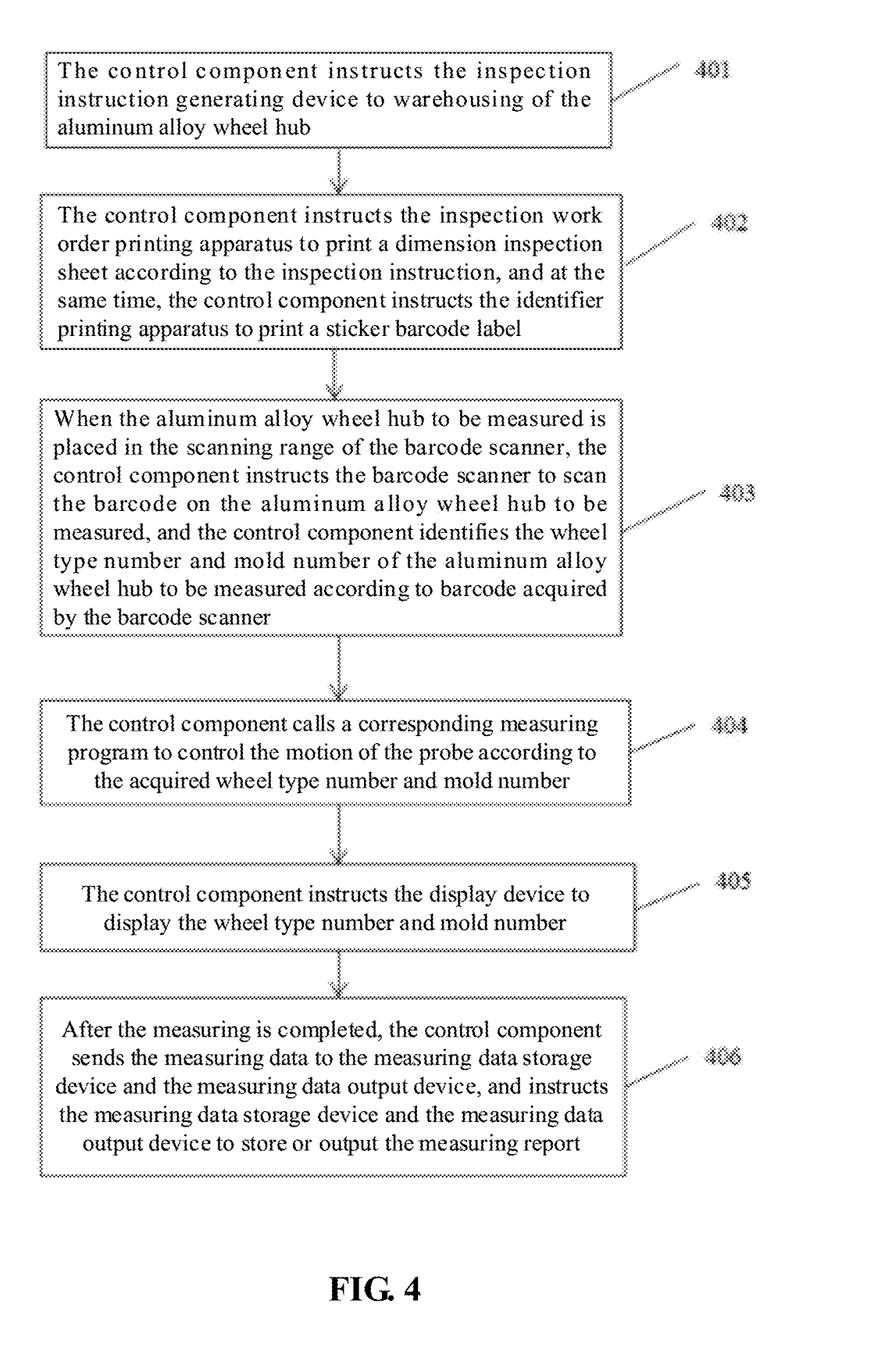
FIG. 4 is a schematic flow chart of the three-coordinate measuring method for aluminum alloy hub according to Embodiment 3 of the present disclosure.
Figure 5:
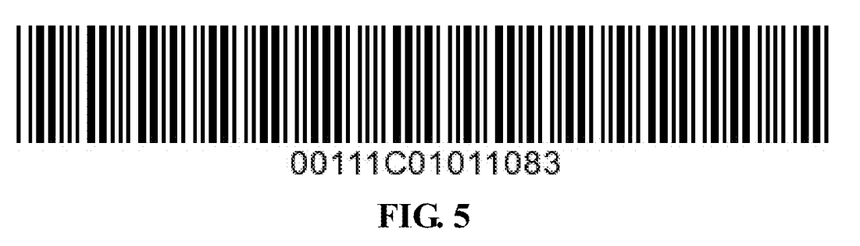
FIG. 5 is a schematic diagram of the barcode in the Embodiment 3 of the present disclosure.

As shown in FIG. 4, an embodiment of the present disclosure further provides a three-coordinate measuring method for an aluminum alloy, herein the method includes:

Step 401: the control component of the three-coordinate measuring apparatus instructs the inspection instruction generating device to issue an inspection instruction according to the warehousing of the aluminum alloy wheel hub;

Step 402: the control component instructs the inspection work order printing apparatus to print a dimension inspection sheet according to the inspection instruction, and at the same time, the control component instructs the identifier printing apparatus to print a sticker barcode label;

Specifically, the control component instructs the inspection work order printing apparatus to print the dimension inspection sheet corresponding to the aluminum alloy wheel hub to be measured, and the control component instructs the identifier printing apparatus to print the barcode (as shown in FIG. 5), which includes the wheel type number and mold number of the aluminum alloy wheel hub to be measured, on the sticker paper. The self-adhesive label printed with the barcode is attached to the rim portion of the aluminum alloy wheel hub to be measured, so as to facilitate the preservation, searching and traceability of the hub.

Step 403: when the aluminum alloy wheel hub to be measured is placed within the scanning range of the barcode scanner, the control component instructs the barcode scanner to scan the barcode on the aluminum alloy wheel hub to be measured, and the control component identifies the wheel type number and mold number of the aluminum alloy wheel hub to be measured according to barcode acquired by the barcode scanner;

Specifically, the operator places the aluminum alloy wheel hub to be measured attached with a barcode in the scanning range of the barcode scanner, and the control component instructs the barcode scanner to scan the barcode attached to the aluminum alloy wheel hub to be measured. The control component identifies the wheel type number and mold number of the hub to be measured contained in the barcode according to the barcode pattern acquired by the barcode scanner.

It should be understood that it is also possible for the control component to instruct the barcode scanner to scan the barcode in the dimension inspection sheet.

Step 404: the control component calls a corresponding measuring program to control the motion of the probe according to the acquired wheel type number and mold number.

Specifically, based on the acquired wheel type number and mold number, the control component searches the memory for a measuring program corresponding thereto, and executes the found measuring program, that is, controls the motion of the probe.

Step 405: the control component instructs the display device to display the wheel type number and mold number;

Specifically, the display device is generally provided with a display screen facing the operator, and the control component instructs the display device to display the wheel type number and mold number on the display screen for the operator to check, further reducing the probability of error.

Step 406: after the measuring is completed, the control component sends the measuring data to the measuring data storage device and the measuring data output device, and instructs the measuring data storage device and the measuring data output device to store or output the measuring report;

Specifically, the measuring data storage device may be a storage device of a magnetic medium, and the measuring report may be a paper measuring report that is directly printed out, or may be an electronic version of the measuring report that is output. In this way, it is convenient to statistically analyze, analyze and utilize measuring data to improve product quality.

The detection process in the related art is as follows: 1) printing the dimension inspection sheet; 2) measuring the dimension by a manual measuring tool, and fill in the dimension inspection sheet; 3) the operator searching a three-coordinate measuring program according to the wheel type; 4) calling the three-coordinate measuring program to perform measurement; and 5) filling in the dimension inspection sheet.

Compared with the existing detection process, in the detection process provided by the embodiment, the wheel type number of the aluminum alloy wheel hub to be measured is acquired by scanning and identifying the barcode, and then the three-coordinate measuring apparatus automatically calls the measuring program according to the acquired wheel type number, so that the process of calling measuring program is convenient, fast and accurate, which not only improves the detection efficiency, but also effectively prevents man-made faults and avoids economic loss.

In addition, in practical use, it is also possible to directly print the outer shape picture and the barcode of each of the hubs to be measured, and after the hub to be measured is manually identified, the barcode of the hub to be measured is placed in the scanning range of the barcode scanner. The three-coordinate measuring apparatus identifies and acquires the wheel type number of the hub to be measured according to the barcode pattern acquired by scanning, and calls a corresponding measuring program according to the acquired wheel type number, so that although the identification error of the hub cannot be avoided, the speed of calling the measuring program can be faster, thereby improving the detection efficiency.

Figure 6:
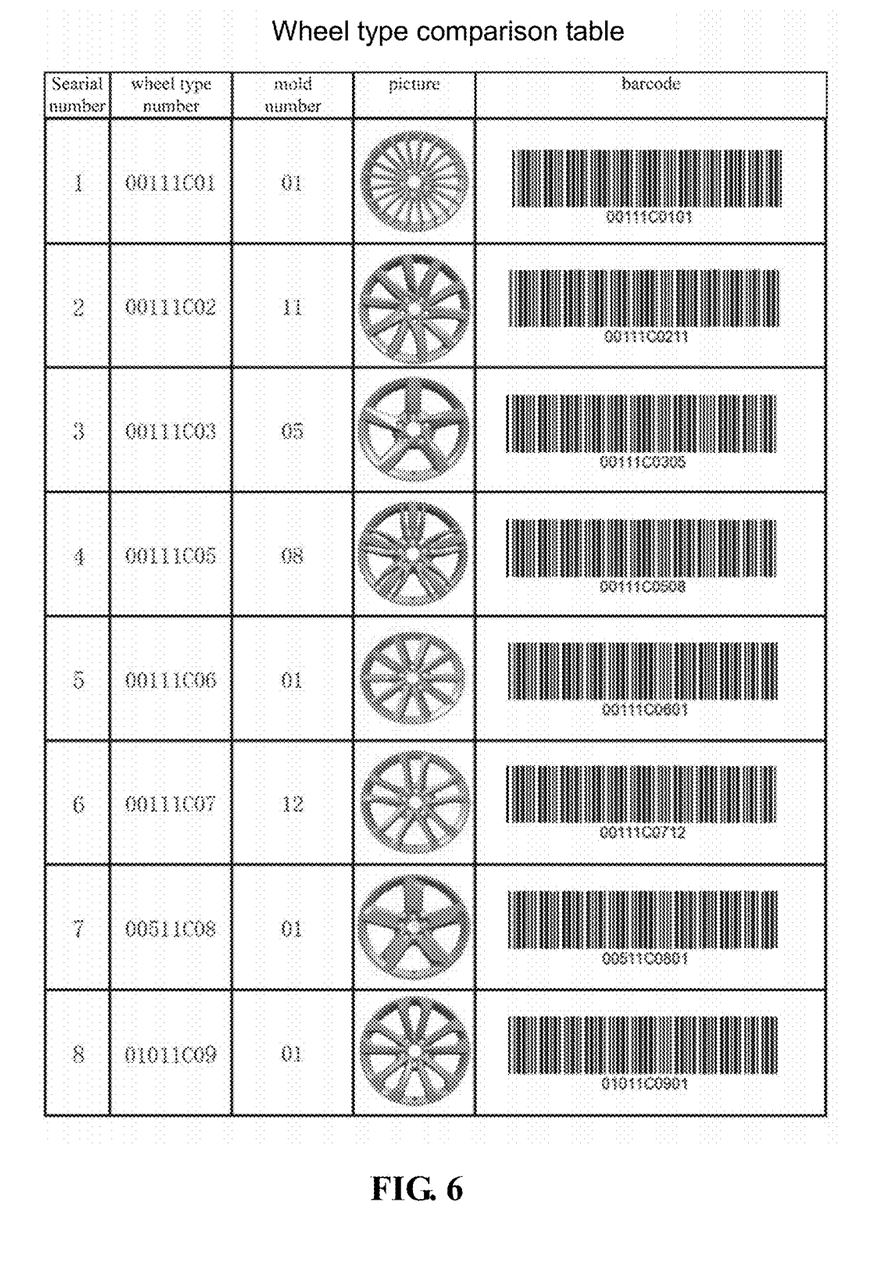
FIG. 6 is a schematic diagram of the wheel type comparison table according to the Embodiment 3 of the present disclosure.

Specifically, the shape picture and the barcode of each of the hubs to be measured are shown in the wheel type comparison table of FIG. 6.

The above is only a specific description of the preferred embodiments of the present disclosure, and is not intended to limit the scope of the present disclosure, and any other equivalents are intended to fall within the scope of the present disclosure.

The invention claimed is:

1. A three-coordinate measuring system, comprising a three-coordinate measuring apparatus, and a type collector for a product to be measured;
   the three-coordinate measuring apparatus is provided with a probe, and a control component which is arranged to control motion of the probe through a measuring program preset according to product type of the product to be measured, wherein the control component is arranged to be electrically connected to the probe;
   the type collector for the product to be measured comprises an optical collecting head capable of scanning a graphic identifier, wherein the optical collecting head is arranged to be electrically connected to the control component;
   the control component is arranged to acquire the product type of the product to be measured according to the graphic identifier scanned by the optical collecting head, and call a measuring program corresponding to the acquired product type to control the motion of the probe in order to measure the product to be measured and acquire measuring data,
   wherein the three-coordinate measuring system is further provided with an identifier printing apparatus which is arranged to print the graphic identifier according to the acquired inspection instruction of the product to be measured, the graphic identifier contains product type information of the product to be measured and is capable of being pasted on a surface of the product to be measured; and the identifier printing apparatus is arranged to be electrically connected to the control component, and
   wherein the coordinate measuring system further comprises an inspection instruction generating device which is arranged to generate an inspection instruction according to warehousing of the product to be measured, and an inspection work order printing apparatus which is arranged to print an inspection work order according to the inspection instruction; after the inspection instruction generating device generating the inspection instruction, the identifier printing apparatus is arranged to print the graphic identifier, and at the same time the inspection work order printing apparatus is arranged to print the inspection work order; the inspection instruction generating device and the inspection work order printing apparatus are both arranged to be electrically connected to the control component.

2. The three-coordinate measuring system according to claim 1, wherein the graphic identifier is a barcode or a two-dimensional code, and the type collector for the product to be measured is a barcode scanner or a two-dimensional code scanner.

3. The three-coordinate measuring system according to claim 1, wherein the three-coordinate measuring apparatus further comprises a memory, the memory is arranged to store the measuring program, and the memory is arranged to be electrically connected to the control component.

4. The three-coordinate measuring system according to claim 1, wherein the three-coordinate measuring apparatus is further provided with a display device, the display device is arranged to be electrically connected to the control component;
   the control component is further arranged to send the product type to the display device after acquiring the product type of the product, and the display device is arranged to display the product type.

5. A three-coordinate measuring method, comprising:
   controlling an inspection instruction generating device to generate an inspection instruction according to warehousing of a product to be measured;
   controlling, according to the inspection instruction generated by the inspection instruction generating device, an identifier printing apparatus to print a graphic identifier of the product corresponding to the inspection instruction and an inspection work order printing apparatus to print an inspection work order of the product corresponding to the inspection instruction at the same time;
   acquiring product type of the product to be measured according to the graphic identifier scanned by an optical collecting head;
   calling a preset measuring program according to the acquired product type;
   controlling the motion of a probe according to the measuring program, measuring the product to be measured and acquiring measuring data.

6. The three-coordinate measuring method according to claim 5, wherein the acquiring the product type of the product to be measured according to the graphic identifier scanned by the optical collecting head comprises:
   scanning, by the optical collecting head, the graphic identifier placed within scanning range of the optical collecting head;
   acquiring the product type of the product to be measured according to pattern of the graphic identifier acquired by scanning of the optical collecting head.

* * * * *